March 15, 1938. G. A. TINNERMAN 2,111,106
TOOL
Filed July 31, 1937
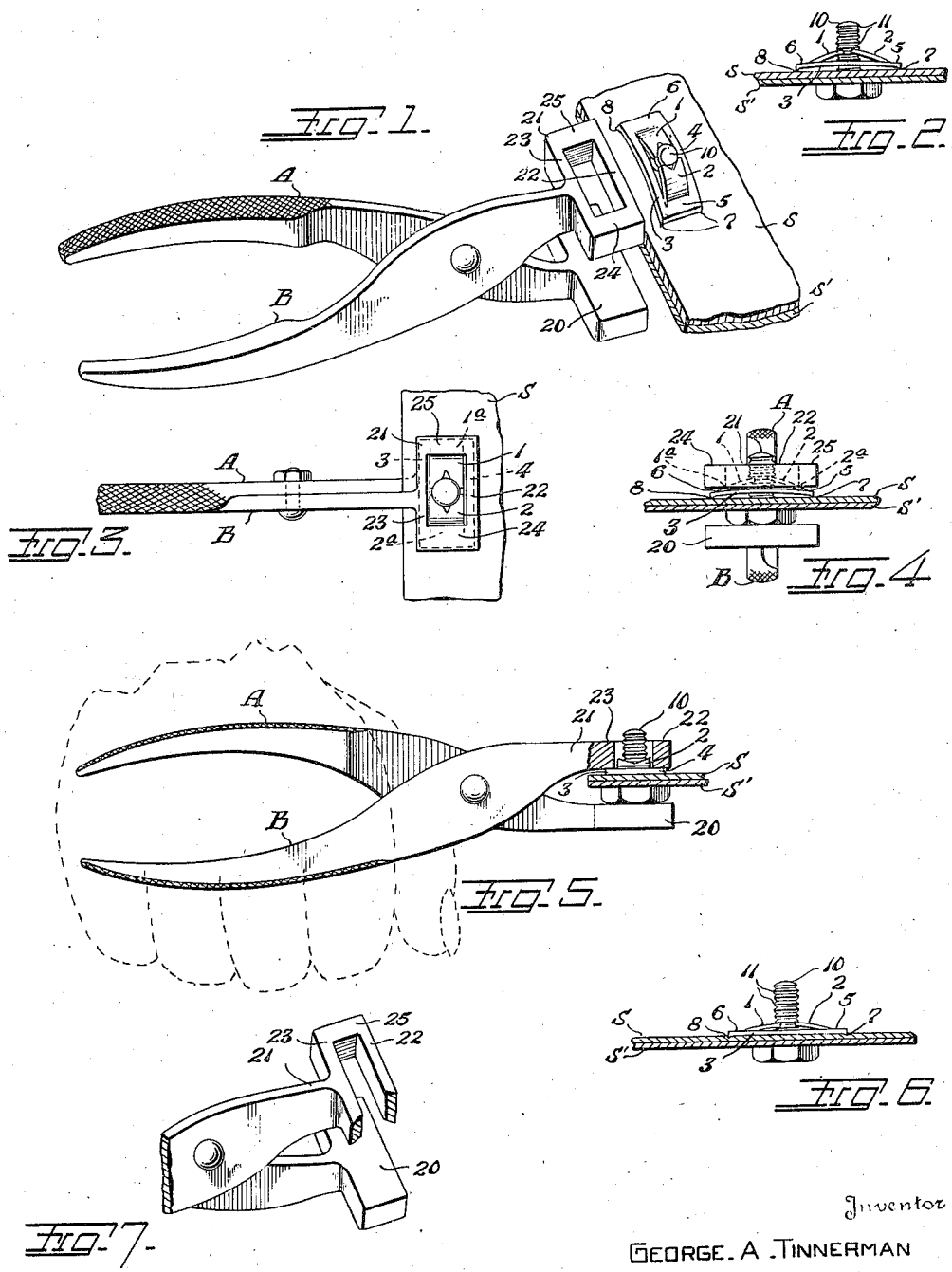
Inventor
GEORGE A. TINNERMAN
Attorney Patented Mar. 15, 1938

2,111,106

UNITED STATES PATENT OFFICE 2,111,106

TOOL

George A. Tinnerman, Rocky River, Ohio, assignor to Albert H. Tinnerman, Cleveland, Ohio Application July 31, 1937, Serial No. 156,786

4 Claims. (Cl. 81—5.1)

This invention relates to improvements in tools for applying "spring" nuts and threadless sheet metal nut devices and the like to tensioned fastening engagement on a threaded bolt or stud.

More particularly, this invention deals with improved tool means for use with a sheet metal or "spring" nut device in assembled position on a bolt and which may be employed for easily and quickly tightening the nut to locked fastening engagement, without stripping the threads of the bolt, simply by direct axial force or pressure exerted on the nut itself.

Certain well known forms of sheet metal, threadless nut devices with which the tool of the present invention is employed, are constructed of a relatively thin section of sheet metal or heat-treated, tempered spring steel and comprise end portions joined by intermediate bridge portions between which tongues or similar bolt engaging means project upwardly to engage a threaded bolt or stud. Due to the inherent resiliency of the metal and the manner in which the tongues are provided, such nut devices are capable of quick, easy assembly on the bolts in a substantial axial thrust, ratchet-like action of the tongues with the bolt threads. However, on being thus applied, in order to provide a locked, rigid fastening engagement to prevent accidental loosening, it has heretofore been necessary to subject the nut device and bolt to relative turning movement, after the initial attachment, in order to tension the tongues in locked fastening engagement with the last most effective thread on the bolt. This has required that a special tool be applied to rotate the nut while the bolt is held rigid by a screwdriver or wrench. In mass production from a standpoint of speed and efficiency in assembling operations, this procedure is objectionable since the necessary step of applying the tool to the nut, after the initial attachment, and then rotating the same relative to the bolt to obtain a locked fastening engagement is not easily accomplished and necessarily consumes an inordinate amount of time of the operator.

In another procedure it has been attempted to speed assembling operations by applying threadless sheet metal or "spring" nuts to locked fastening engagement with the bolts, after the initial attachment, by the use of a tool in the form of a substantial yoke device comprising a pair of arms which contact the spring tongues on either side of the bolt to force them, in a ratchet-like action, to rigid, effective fastening engagement with the lowermost thread of the bolt. In practice, this procedure has been found inexpedient in that the tongues of the spring nuts do not tend to snap freely over the threads of the bolt or screw, and also, the tongues necessarily are deformed upwardly in concave, bowed relation relative to the base of the nut to such extent that the extremities of the tongues are out of effective contact with the bolt threads, and accordingly, the tongue extremities tend to slip over or climb into the next thread under strain and vibration of the parts secured, thereby rendering the nut inefficient and loose in fastening engagement on the bolt.

In still another application "spring" nuts provided with yieldable tongues are employed with threadless shank elements such as nails or rivets. It has been found that any substantial pressure exerted on the tongues of the nuts prevents the same from being readily advanced to tightened, fastening engagement against the work, since such pressure prevents the tongues from yielding sufficient to permit the extremities thereof to slide easily on the threadless shank to the position of most effective fastening engagement.

The tool of the instant invention is admirably suited for any known application of a threadless sheet metal nut, or the like, comprising yieldable tongues or similar bolt engaging means inasmuch as the basic concept involved is founded upon the feature of advancing the nut device to locked fastening position on a bolt or stud by substantial pressure applied to portions of the nut other than the tongues or similar bolt engaging means.

It is therefore a primary object of this invention to provide a tool for use with sheet metal or "spring" nuts, and the like, and which is designed for readily fitting onto the nuts and easily and quickly advancing them to most effective, locked fastening engagement with a cooperating threaded bolt or screw, or threadless shank such as a nail or rivet.

Another principal purpose of the present invention is to provide a tool adapted to easily and quickly advance a sheet metal nut device to locked fastening engagement on a threaded bolt or screw in a direct axial thrust without stripping the threads thereof or deforming the bolt engaging means out of uniform threaded engagement therewith.

A still further object of the invention contemplates the provision of a tool provided with means having such contact and cooperative engagement with the elements of a sheet metal nut, as to force the same to locked fastening engagement with the lowermost thread of the bolt adjacent the work simply by pressure on the nut itself and without requiring relative turning movement of the nut and bolt.

Further objects and advantages of the invention will be apparent to those skilled in the art as a description thereof proceeds with reference to the accompanying drawing in which like reference characters designate like parts throughout the same, and in which:

Fig. 1 is a perspective of the improved tool shown about to be fitted to an assembled bolt and sheet metal nut for applying the same to locked fastening engagement;

Fig 2 shows an assembled bolt and sheet metal nut in side elevation, preparatory to the application of the tool thereto for placing the same in locked fastening engagement securing superposed apertured sheets;

Fig. 3 is a top plan view of the improved tool showing the recessed jaw member as applied for advancing the sheet metal nut to locked fastening position on the bolt;

Fig. 4 is a side elevation looking from the right of Fig. 3;

Fig. 5 is a front elevation of Fig. 3, with the recessed jaw of the tool being represented in section to show the application of the side head portions thereof to the bridge portions of the sheet metal nut;

Fig. 6 shows the assembled sheet metal nut and bolt as applied to locked fastening engagement securing superposed apertured sheets; and Fig. 7 is a fragmentary perspective of the jaws of the improved tool, parts of the recessed jaw being broken away to show in detail the cross-section of the side head portions thereof.

Referring now to the drawing, Figs. 1, 2, and 6 show a form of threadless sheet metal nut devices of the type adapted to be applied to locked fastening engagement on a bolt by the tool of the present invention; the nut devices are constructed from sections of sheet metal, cold rolled metal, spring steel or the like and comprise end portions 5, 6 and bridge portions 3, 4, between which integral, yieldable tongues 1, 2, or similar bolt engaging means extend or project upwardly for engaging the threads of the bolt or stud 10. The said end and bridge portions provide, what may be termed, the body of the nut, which body is so formed in the stamping operation as to present a normally untensioned, generally concave base from which the tongues extend upwardly in substantial ogee formation with the extremities thereof so spaced as to lie on a helix corresponding to the pitch of the threads on the bolt fastening for uniform theaded engagement therewith. Preferably the corner extremities of the end portions 5, 6, of the concave base are bent downwardly with the metal stressed beyond its elastic limit thereby providing sharp anchoring prongs 7, 8, on the underface of the sheet metal body. Thus, when a nut device is tightened against a surface, the end portions 5, 6, thereof are moved from their initial, normally untensioned position in the concave base outwardly and upwardly in a substantial lifting force which is transmitted to the tongues 1, 2, to urge the same inwardly relative to each other, whereby the said tongues are caused to dig into and become embedded in the threads and root diameter of the bolt in locked fastening engagement therewith. At the same time the bowed bridge portions 3, 4, are elongated such that the generally concave base assumes the position of a substantially thin flat section, Fig. 6, disposed in close proximity to the adjacent surface with the anchoring prongs, 7, 8, provided by the corner extremities, somewhat embedded therein, whereby the nut device is anchored with no parts projecting sufficient to be engageable by a conventional tool and accordingly cannot be readily removed except by a special tool by authorized persons. From the foregoing, it will be understood that the bending moment which serves to lock the nut device on the bolt in the final applied position, is produced by the downward pressure of the engaged bolt thread at the extremities of the tongues and the upward reaction pressure applied to the tongues by the tensioned bridge and end portions of the flattened base in attempting to assume its initial, normally untensioned, concave configuration.

Heretofore, spring nut devices of the general character referred to have been attempted to be applied to fastening position on a bolt by means of a tool comprising a jaw element in the form of a substantial yoke designed to contact the tongues intermediate their lengths to move them in a substantial rachet-like action to fastening engagement with the lowermost available thread on the bolt. However, with such a tool arrangement, the tongues do not tend to snap freely over the threads of the bolt and are necessarily disposed in arched relation upwardly with respect to the base thereof to such extent that the extremities of the tongues are not in most effective contact with the bolt threads; thus, it will be understood, that in this procedure, though pressure is applied directly to the tongue elements, a certain amount of reaction tension is necessarily stored up in the bridge and end portions of the nut device such that when the tool is withdrawn and the attendant pressure is removed from the tongues, this stored reaction tension is transmitted to the upwardly arched tongues, the extremities of which, as above stated, are not in most effective contact with the bolt threads. And upon any degree of vibration, jarring or strain in the fastened member, the said tongue extremities most often slip over or climb into the next bolt thread resulting in a relatively loose fastening engagement and rendering the nut useless.

These objectionable features are completely overcome in the use of a tool such as proposed in the instant invention in which the pressure for advancing sheet metal nut to locked fastening position on a bolt is applied more directly to the bridge and end portions to flatten the generally concave base and thereby dispose the tongue elements into desired tensioned, locking engagement with the bolt in the normal disposition of the tongue extremities without upwardly arching or otherwise deforming the same out of most effective contact with the bolt threads, the same as if the nut device were applied by the time-consuming process of rotating the same onto the bolt threads.

As shown particularly in Figs. 1, 3, 5, and 7, the novel tool structure of the instant invention comprises a pair of coacting jaw members 20, 21 designed to supply between them a substantial compressing action. Preferably the jaw members are incorporated in a pincer or plier-like arrangement comprising elements A, B, such that the tool may be operated with one hand leaving the other hand of the operator free for applying the nut devices to initial attachment onto the bolts. The said jaw members 20, 21, of the tool are then fitted to either side of the assembly as shown in Fig. 4, and the handles of the pliers compressed to advance the spring nut to locked fastening engagement on the bolt as hereinafter more fully set forth.

In Figs. 1, 2, and 5, it will be seen that one of the jaw members 21, is in the form of a substantially recessed head, the recess being so designed as to snugly receive the projecting tongues 1, 2, in engagement with the bolt 10 substantially as shown in Figs. 3 and 4. Accordingly, the recessed head member 21 comprises end portions 24, 25 merging with side portions 22, 23 adapted to contact only the initially concaved bridge portions 3, 4 of the nut devices as shown in Figs. 3, 4, and 5 to advance the same from the position shown in Fig. 2 to the substantially flattened position shown in Fig. 6.

Preferably the end portions 24, 25, are so designed as to contact the tongues 1, 2 slightly at the base thereof as shown at 1a, 2a in Figs. 3 and 4. This arrangement does not in any way affect the action of the side portions 22, 23 of the tool in flattening the bridge portions 3, 4, of the nut, and has the important advantage of exerting sufficient pressure on the tongues themselves to ensure a rachet-like action of the extremities of the tongues with the bolt threads 11 to the position of positive engagement with the lowermost effective thread of the bolt without arching or deforming the tongue extremities from their desired disposition in most effective, uniform, threaded engagement with the bolt threads as shown in Fig. 6.

Thus in the use of the tool proposed in the instant invention, the pressure for advancing a sheet metal nut to locked fastening position on a bolt or stud is applied more directly to the bridge and end portions to flatten the generally concave base and thereby place the bolt engaging elements into desired locking engagement with the lowermost effective thread of the bolt i ⋅ the normal disposition of the tongue extremities without upwardly arching or otherwise deforming the same out of most effective contact with the bolt threads. For example, as shown in Fig. 2, the sheet metal nut device comprises tongue elements 1, 2, of substantially ogee formation with the extremities thereof lying on a helix corresponding to the pitch of the bolt threads for uniform threaded engagement therewith. This essential ogee formation of the tongues causes the extremities thereof to engage the bolt on a plane disposed substantially at right angles to the bolt axis and thereby ensures the most effective positive engagement of the tongue extremities with any of the bolt threads at all times. It will therefore be understood, that in order that sheet metal nut devices of this form have most efficient, uniform threaded engagement with the bolt threads under tension in applied position, they must be advanced to locked fastening position with the lowermost effective thread of the bolt with the tongues possessed of their essential ogee formation which as, above set forth, ensures a positive engagement of the tongues with the bolt threads and prevents the same from slipping over or climbing into the next thread resulting in a relatively loose fastening engagement. In accordance with this procedure, it is therefore essential that any tool for effectively advancing such sheet metal nut devices to locked fastening position on a bolt must be so designed with a recessed compressing head having no substantial portion in contact with the tongues or similar bolt engaging means.

The tool of the instant invention is admirably suited for such purpose in that it comprises a recessed jaw or nut compressing element which is so designed as to have the main portions thereof in such position as to compress and flatten the bridge portions 3, 4, and the end portions 5, 6. A slight degree of pressure is applied to the tongues 1, 2, only at the bases thereof as at 1a, 2a, Figs. 3 and 4, in order to ensure that the tongue extremities will be forced to snap into engagement with the lowermost effective thread on the bolt at the same time the said bridge and end portions are tensioned by flattening to the substantial position shown in Fig. 6; thus the tongues are tensioned in locked fastening position but are not deformed out of their essential ogee formation or arched upwardly out of most effective, positive engagement with the bolt threads.

From the foregoing it will be understood that, in operation, the "spring" nuts or sheet metal nut devices, in the initial attachment to their associated bolts, are placed upon the bolts by the operator in an easy quick attachment by simple axial force applied thereto with the fingers. This is possible by reason of the fact that the tongues or similar bolt engaging means are yieldable whereupon the thread engaging extremities thereof are capable of substantial sliding, ratchet-like action with the bolt threads, thus reducing considerably the time required for otherwise initially attaching the nuts as by threading onto the associated bolts in the conventional rotating action.

After the nut devices have been thus applied to their respective bolts to substantially the position shown in Fig. 2 securing parts S, S', the jaw members 20, 21 of the tool are then readily fitted to the assembly as shown in Figs. 4 and 5 and the handles of the pliers compressed to flatten the generally concave base and advance the tongues or similar bolt engaging means to locked fastening engagement with the lowermost effective thread of the bolt as shown in Fig. 6. Inasmuch as the jaw 21, Fig. 3, has the recess thereof so designed as to snugly receive the tongues 1, 2, or similar bolt engaging means, the tool automatically seats itself in desired position on the nut device with the side portions 22, 23 in contact with the bridge portions 3, 4, as shown in Fig. 4. Upon compression of the handles A, B, of the tool to the position shown in Fig. 5 the said arched bridge portions 3, 4 of the generally concave base, together with the end portions 5, 6, are tensioned and flattened to the position shown in Fig. 6; at the same time the prong members 7, 8, provided on the underface of the base of the nut are caused to be embedded into the adjacent surface S and the extremities of the tongues 1, 2, by reason of the contact of the end portions 24, 25, in contact with the bases of said tongues, as at 1a, 2a, Figs. 3 and 4, are caused to be snapped into uniform, threaded engagement with the lowermost effective thread of the bolt, Fig. 6, without disturbing the essential ogee formation of the said tongues 1, 2. Thus a most rigid, tightened fastening engagement may be obtained in a minimum of time and effort and provides an installation in which the nut device is locked upon the bolt by reason of the tensioned engagement of the tongues with the lowermost effective thread of the bolt, and which cannot become loosened by rotation incident to jarring, vibration and strain effects because of the anchored engagement of prongs 7, 8, embedded in the surface S. If desired the anchoring prongs 7, 8, may be dispensed with without affecting the efficiency of the nut devices in applied fastening position, since the rigid, tensioned, locking engagement of the tongues with the lowermost effective thread of the bolt is so pronounced as to be entirely sufficient to maintain the assembly in locked fastening position for long periods of use and under normal conditions of jarring, vibration, and strain. It may be also pointed out, that though the thread engaging portions of the nut devices are shown as comprising yieldable tongues, other equivalent forms of stud and bolt thread engaging means may be employed and effectively applied to tensioned, fastening engagement by the tool of the instant invention.

While this invention has been described in detail with specific examples such examples are illustrative only, since it will be apparent to those skilled in the art that other modifications within the spirit and scope of the invention may be constructed without departing from the teachings or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tool of the class described comprising a pair of relatively movable jaws, one of said jaws being in the form of a recessed head member adapted to compress a threadless sheet metal nut device, having a generally concave base and projecting bolt engaging means, to locked fastening engagement with a bolt, said head member comprising end portions and side portions, said side portions being spaced apart a sufficient distance to straddle the bolt engaging means and to flatten the concave portions of the base of the nut device to tensioned relation by direct axial thrust without deforming the said projecting bolt engaging means out of most effective contact with the bolt, said other jaw serving as a backing means for the bolt during the compressing action of said head member.

2. A plier-like hand tool of the class described comprising a pair of pivoted jaws, one of said jaws being in the form of an apertured head member adapted to advance a threadless sheet metal nut device, having a generally concave base and projecting bolt engaging tongues deformed therefrom, to locked fastening engagement with a threaded bolt, said apertured head member comprising end and side portions, said side portions being spaced apart a distance sufficient to straddle said tongues and to engage and flatten the concave portions of the base of the nut, and said end portions being spaced apart a distance sufficient for engaging the base only of said tongues whereby said nut device may be advanced to tensioned relation by substantially direct axial thrust to dispose said projecting tongues in locked fastening engagement with the last effective thread on said bolt without deforming the said tongues out of most effective engagement with the threads, said other jaw member being adapted to serve as a backing means for the bolt during the compressing action of said apertured head jaw member.

3. For applying a sheet metal nut device having a generally concave base and projecting bolt engaging means to locked fastening engagement with a bolt, a tool comprising a recessed head member including end and side portions, said side portions being spaced apart a sufficient distance to straddle said bolt engaging means and to engage and flatten the said generally concave base of the nut device without contacting said bolt engaging means whereby the nut device may be advanced to tensioned relation by substantially direct axial thrust without deforming the bolt engaging means thereof out of most effective engagement with the bolt, said tool comprising means connected to the head member for supporting the bolt during the compressing action of said member.

4. For applying a sheet metal nut device having a generally concave base and projecting bolt engaging means to locked fastening engagement with a bolt, a tool comprising a recessed head member including end and side portions, said side portions being spaced apart a sufficient distance to straddle said bolt engaging means to engage and flatten the generally concave base of the nut device without contacting said bolt engaging means, and said end portions being designed for engaging the base only of said bolt engaging means whereby the nut device may be advanced to tensioned relation upon a supported bolt by substantially direct axial thrust without deforming the bolt engaging means thereof out of most effective contact with the bolt.

GEORGE A. TINNERMAN.